J. D. SPANG.
Vapor Stove.
No. 70,641.
Patented Nov. 5, 1867.
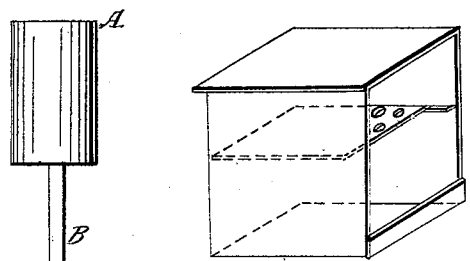
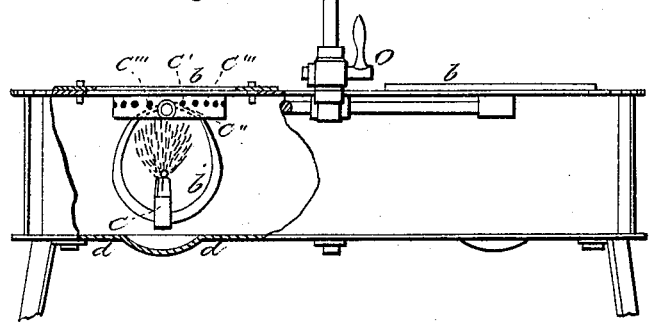
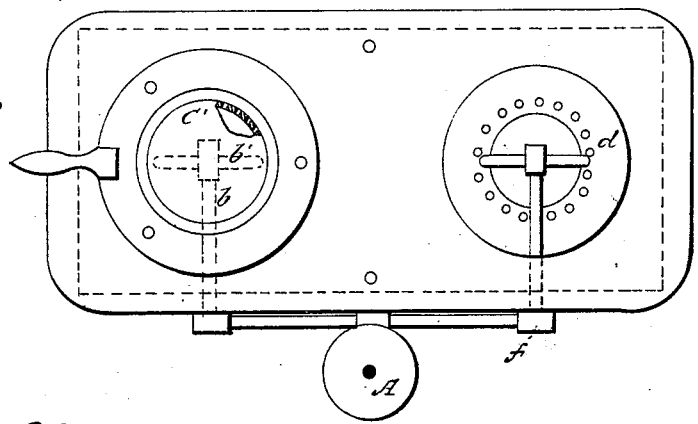
WITNESSES:
INVENTOR:

United States Patent Office.

JACOB D. SPANG, OF DAYTON, OHIO.

Letters Patent No. 70,641, dated November 5, 1867.

---

GASOLINE COOK-STOVE.

---

The Schedule referred to in these Letters Patent and making part of the same.

---

TO ALL WHOM IT MAY CONCERN:

Be it known that I, JACOB D. SPANG, of Dayton, in the county of Montgomery, and State of Ohio, have invented a new and improved Gasoline Cook-Stove; and I do hereby declare the following to be a full, clear, and exact description of the same, reference being had to the accompanying drawings forming part of this specification, and in which—

Figure 1 is a rear view of my invention, with a portion of the side removed to show the interior arrangement.

Figure 2 is a plan view.

Figure 3 represents a portion of the cooking apparatus.

Similar letters of reference indicate corresponding parts.

This invention consists of a simple device for utilizing and diffusing uniformly the heat from gasoline burners for the purpose of cooking.

In the drawings, A represents a reservoir, filled with gasoline, and communicating by means of the pipe B, and branches $b\ b$, with rings $b'$, in which the burners are placed. A stop-cock at the point $o$ regulates the flow of the oil from the reservoir. The burner, C, is of the same construction as that secured by my patent of August 27, 1867, and is arranged within the ring $b'$ in such manner that the heat may be communicated to the gasoline at the point desired, as fully explained in the specification of patent above referred to. Instead, however, of the pipe $b$ joining the ring $b'$ from above, as in former patent, it connects with it at right angles, and with the ring forms a support for the disk $c'$, upon the edge of which is formed the rim $c''$, projecting downward from it, and perforated with the holes $c'''$. A portion of this rim on the rear side is cut out, to avoid interference with the pipe $b$. The object of this arrangement of disk and perforated rim is to catch the heat as it rises from the burner, and diffuses it regularly and uniformly to all sides of the cooking-vessel. $d$ represent perforations in the bottom of the stove, in a circle about the burner, for the purpose of admitting air freely to support combustion. My gasoline apparatus, by this means, is made available for all the various purposes of cooking.

Having thus described my invention, what I claim as new, and desire to secure by Letters Patent, is—

1. The disk $c'$, with perforated rim $c''$, substantially as described.
2. The disk $c'$, perforated rim $c''$, in combination with the ring $b'$ and burner C, substantially as described.

JACOB D. SPANG.

Witnesses:
 JOSEPH WALTER,
 THOS. D. MITCHELL.